(12) United States Patent
Kinser et al.

(10) Patent No.: US 7,774,827 B2
(45) Date of Patent: Aug. 10, 2010

(54) TECHNIQUES FOR PROVIDING ROLE-BASED SECURITY WITH INSTANCE-LEVEL GRANULARITY

(75) Inventors: Stephen Hugh Kinser, Saratoga Springs, UT (US); Lloyd Leon Burch, Payson, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1261 days.

(21) Appl. No.: 11/145,704

(22) Filed: Jun. 6, 2005

(65) Prior Publication Data

US 2006/0277595 A1    Dec. 7, 2006

(51) Int. Cl.
G06F 17/30    (2006.01)
G06F 7/04    (2006.01)

(52) U.S. Cl. .............................................. 726/3; 726/2
(58) Field of Classification Search .................... 726/3, 726/2
See application file for complete search history.

(56) References Cited

U.S. PATENT DOCUMENTS

| | | | |
|---|---|---|---|
| 4,897,781 A * | 1/1990 | Chang et al. ................. | 707/201 |
| 5,544,322 A | 8/1996 | Cheng et al. | |
| 5,764,958 A | 6/1998 | Coskun | |
| 5,878,415 A | 3/1999 | Olds | |
| 5,911,143 A | 6/1999 | Deinhart et al. | |
| 5,926,816 A | 7/1999 | Bauer et al. | |
| 5,991,810 A | 11/1999 | Shapiro et al. | |
| 6,014,666 A | 1/2000 | Helland et al. | |
| 6,023,765 A | 2/2000 | Kuhn | |
| 6,088,451 A | 7/2000 | He et al. | |
| 6,161,139 A | 12/2000 | Win et al. | |
| 6,192,405 B1 | 2/2001 | Bunnell | |
| 6,202,066 B1 | 3/2001 | Barkley et al. | |
| 6,308,181 B1 | 10/2001 | Jarvis | |
| 6,359,900 B1 | 3/2002 | Dinakar et al. | |
| 6,434,607 B1 | 8/2002 | Haverstock et al. | |
| 6,487,665 B1 * | 11/2002 | Andrews et al. .............. | 726/26 |
| 6,553,496 B1 * | 4/2003 | Buer ........................... | 726/34 |
| 6,718,470 B1 | 4/2004 | Adams | |

(Continued)

FOREIGN PATENT DOCUMENTS

EP    0547741 A1    6/1993

(Continued)

OTHER PUBLICATIONS

"European Application No. 06113570.3 Office Action dated Nov. 16, 2007", 22 pgs.

(Continued)

Primary Examiner—Kambiz Zand
Assistant Examiner—William S Powers
(74) Attorney, Agent, or Firm—Schwegman, Lundberg & Woessner, P.A.

(57) ABSTRACT

Techniques for providing role-based security with instance-level granularity are provided. A security service detects a request made by a principal for access to a resource. Access to the resource is conditioned on a status of a role. The role is associated with the request, the principal, and the resource. The security service evaluates a constraint associated with the role to determine the status. The status is subsequently consumed to determine whether access to the resource for the purposes of satisfying the request is permissible.

23 Claims, 3 Drawing Sheets

U.S. PATENT DOCUMENTS

| | | | |
|---|---|---|---|
| 6,732,100 B1 | 5/2004 | Brodersen et al. | |
| 6,870,842 B1 | 3/2005 | Caronni et al. | |
| 6,871,231 B2 | 3/2005 | Morris | |
| 6,871,279 B2 | 3/2005 | Sames et al. | |
| 6,957,261 B2 | 10/2005 | Lortz | |
| 7,020,662 B2* | 3/2006 | Boreham et al. | 707/104.1 |
| 7,035,828 B2 | 4/2006 | Ketonen et al. | |
| 7,062,563 B1 | 6/2006 | Lewis et al. | |
| 7,100,195 B1* | 8/2006 | Underwood | 726/2 |
| 7,140,044 B2 | 11/2006 | Redlich et al. | |
| 7,299,493 B1 | 11/2007 | Burch et al. | |
| 7,316,027 B2 | 1/2008 | Burch et al. | |
| 7,337,318 B2* | 2/2008 | Birk et al. | 713/167 |
| 7,552,468 B2 | 6/2009 | Burch et al. | |
| 7,647,256 B2 | 1/2010 | Burch et al. | |
| 2001/0034841 A1 | 10/2001 | Shambroom | |
| 2001/0049786 A1 | 12/2001 | Harrison et al. | |
| 2002/0026592 A1 | 2/2002 | Gavrila et al. | |
| 2002/0062449 A1* | 5/2002 | Perna et al. | 713/200 |
| 2002/0144142 A1 | 10/2002 | Shohat | |
| 2002/0178119 A1 | 11/2002 | Griffin et al. | |
| 2002/3184310 | 12/2002 | Traversat et al. | |
| 2003/0002521 A1 | 1/2003 | Traversat et al. | |
| 2003/0005290 A1 | 1/2003 | Fishman et al. | |
| 2003/0037263 A1 | 2/2003 | Kamat et al. | |
| 2003/0046576 A1 | 3/2003 | High et al. | |
| 2003/0061144 A1 | 3/2003 | Brickell et al. | |
| 2003/0070070 A1 | 4/2003 | Yeager et al. | |
| 2003/0097449 A1 | 5/2003 | Derocher et al. | |
| 2003/0115487 A1 | 6/2003 | Andrews et al. | |
| 2003/0131025 A1 | 7/2003 | Zondervan et al. | |
| 2003/0229623 A1 | 12/2003 | Chang et al. | |
| 2003/0235309 A1 | 12/2003 | Struik et al. | |
| 2004/0034774 A1* | 2/2004 | Le Saint | 713/169 |
| 2004/0064693 A1 | 4/2004 | Pabla et al. | |
| 2004/0083367 A1* | 4/2004 | Garg et al. | 713/170 |
| 2004/0088563 A1* | 5/2004 | Hogan et al. | 713/200 |
| 2004/0128378 A1 | 7/2004 | Blakley, III et al. | |
| 2004/0187031 A1 | 9/2004 | Liddle | |
| 2004/0210771 A1 | 10/2004 | Wood et al. | |
| 2004/0221043 A1 | 11/2004 | Su et al. | |
| 2005/0055573 A1 | 3/2005 | Smith | |
| 2005/0068983 A1* | 3/2005 | Carter et al. | 370/480 |
| 2005/0171872 A1 | 8/2005 | Burch et al. | |
| 2005/0172116 A1 | 8/2005 | Burch et al. | |
| 2006/0004610 A1 | 1/2006 | David | |
| 2006/0090192 A1* | 4/2006 | Corby et al. | 726/1 |
| 2007/0294750 A1 | 12/2007 | Burch et al. | |
| 2008/0016232 A1 | 1/2008 | Yared et al. | |

FOREIGN PATENT DOCUMENTS

| | | |
|---|---|---|
| EP | 765062 A2 | 3/1997 |
| EP | 765062 B1 | 11/2005 |
| WO | WO-9906900 | 2/1999 |
| WO | WO-0079432 A1 | 12/2000 |

OTHER PUBLICATIONS

Schneier, B., "Applied Cryptography" 2nd *Edition*, (1995), 185-187.

Goodwin, R., et al., "Instance-Level access control for Business to-Business Electronic Commerce", *PowerPoint Presentation*, Presented By Vandana Janeja,(2001),1-48.

Goodwin, R., et al., "Instance-level access control for business-to-business electronic commerce", *IBM Systems Journal*, vol. 41, No. 2, (2002),303-317.

Sun Microsystems, Inc., "Java? 2 Platform Enterprise Edition Specification, v1.4", *Sun Microsystems, Inc. User Manual*, Final Release,(Nov. 24, 2003),1-246.

* cited by examiner

TECHNIQUES FOR PROVIDING ROLE-BASED SECURITY WITH INSTANCE-LEVEL GRANULARITY

FIELD

The invention relates generally to software security and more particularly to techniques for providing role-based security with instance-level granularity.

BACKGROUND

Securing access to information and resources is an important function of business software. Business software stores sensitive information, including financial records, credit card numbers, customer lists and client records. The effects of unauthorized access to this sensitive information can be costly and dangerous.

For example, medical records software in a hospital should allow only those with a legitimate need, such as a doctor or nurse, to access patient records. Unauthorized access to patient records unnecessarily compromises patient privacy. Business software should secure sensitive information, such as patient records, by preventing unauthorized access to sensitive information.

One manner of providing software security is to use role-based declarative security. In role-based declarative security, an administrator or deployer assigns each user of a software application an appropriate role. The administrator also allocates each resource, such as a database, an object, a data structure, a printer, a network, an application, and the like, a permission assignment comprising a list of roles that may legitimately access the resource.

Typically, the software application executes within an application server. Each time a user requests access to a resource, the application server compares the role assigned to the user with the permission assignment for the resource to determine whether access is permissible. If the user's role is on the permission assignment list, the application server allows the user to access to the resource. If the role is not on the permission assignment list, the application server denies access to the resource.

For example, each user of medial records software may be assigned a role such as "patient," "doctor," "nurse," "administrator," "nutritionist," or "orderly." The application administrator assigns each resource, such as a patient record, a printer, or a telephone directory, a permission assignment containing a list of the roles that may legitimately access the resource. A patient record may have a permission assignment including the roles "doctor" and "nurse."

The application server underlying the software would allow a user assigned the role "doctor" to access the patient record since "doctor" is one of the roles included in the patient record's permission assignment. However, a user assigned the role "orderly" would not be allowed access to the patient record since "orderly" is not one of the roles included in the patient record's permission assignment.

In role-based declarative security, users are assigned a role based on their designations. For example, all doctors receive the "doctor" role and all nurses receive the "nurse" role. This conventional approach results in limited granularity of roles. For example, all users assigned the role "doctor" in a role-based access scheme may be permitted to access patient records.

In the example described above, role-based declarative security allows a doctor to access a patient record for someone who is not that doctor's patient but another doctor's patient. Such access may compromise patient privacy. This problem may be overcome by creating a unique role for each doctor and allocating that role to the permission assignment of each of each doctor's patients.

Furthermore, a programmer may have to modify and re-release the software for purposes of creating new role types each time new access conditions exist. For example, a new role type defined as a "Primary Care Physician" may provide access to only those patient records that lists a particular doctor as being an authorized participant of the general "doctor" role. To account for this situation, a programmer would have to re-release the software to take into account the new role type for the general role. This approach is impractical. Consequently, role-based declarative security does not offer a practical way to implement fine-grained role-based security.

Of course, the software application could perform role-based security rather than the underlying application server. This approach to security is known as application security or imperative security. However, the code required to properly control access is complex and expensive to implement.

Accordingly, there is a need for improved techniques of role-based declarative security. The security techniques should implement fine grain access controls for a given resource, without modifying interfaces associated with that resource.

SUMMARY

In various embodiments, techniques for providing role-based security with instance-level granularity are presented. More specifically, and in an embodiment, a principal requests access to a resource. A security service detects the request. Access to the resource is allowed based on a status of a role associated with the principal. The security service dynamically evaluates a constraint associated with the role to determine the status. The status is compared with the request for access to the resource to determine whether access to the resource, for the purposes of satisfying the request, is permissible.

DETAILED DESCRIPTION

Figure 1:
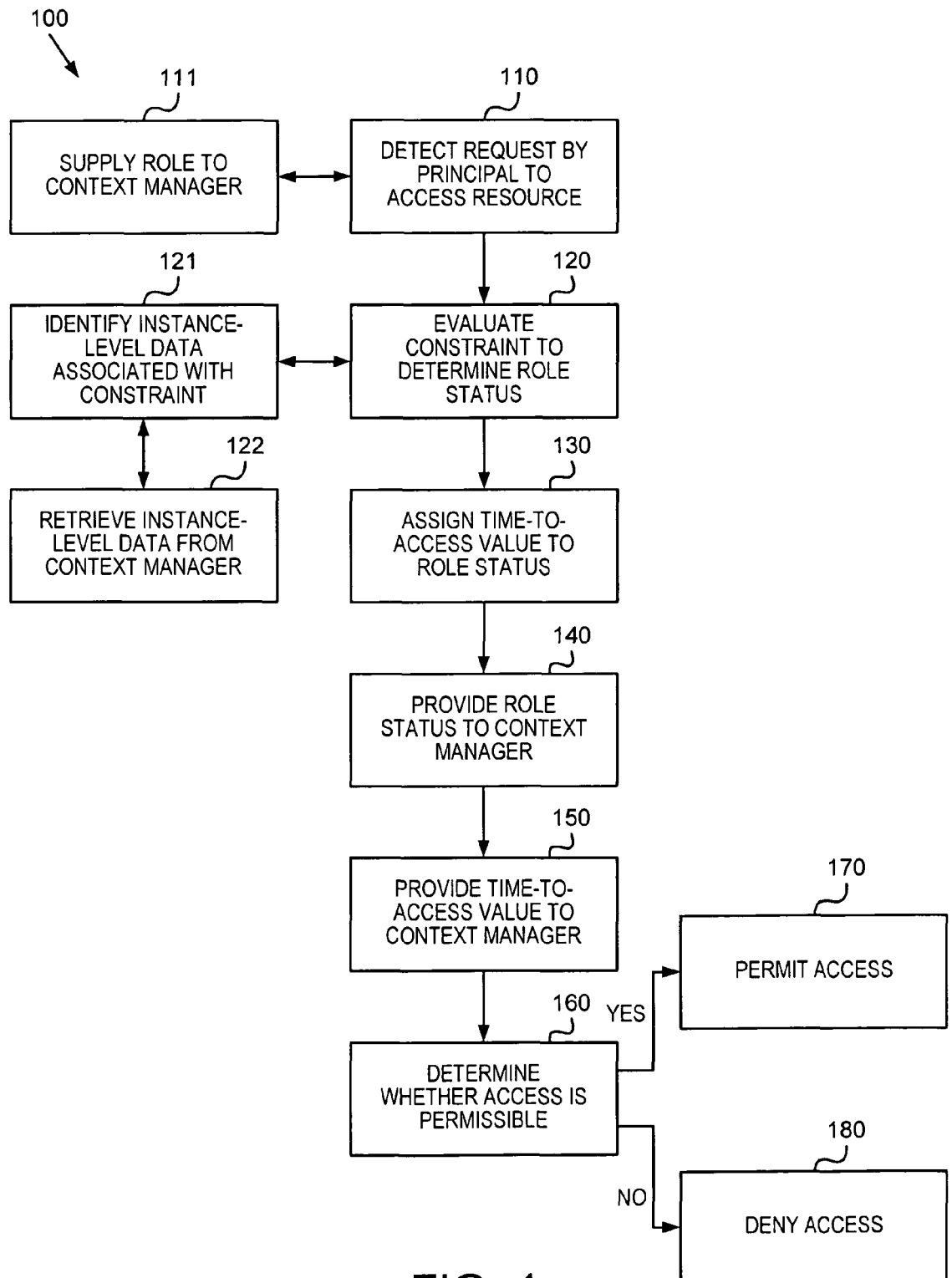
FIG. 1 is a flowchart representing a method for role-based security, according to an example embodiment.

In various embodiments of the invention, the term "principal" is used. A principal is an electronic representation of a user or an application. In one embodiment, the term principal is consistent with how that term is generally understood in the security arts.

For example, the term principal can be used in the context of Security Assertion Markup Language (SAML), which is an extension of the Extensible Markup Language (XML). SAML is used for securely declaring assertions about a user or application (i.e., principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

However, it is to be understood that SAML and Liberty techniques are not needed to perform the teachings of all embodiments of the invention. These techniques complement some embodiments of this invention. In this sense, the integration of SAML and Liberty techniques with some of the embodiments presented herein is intended to be part of certain aspects of this invention, but not all embodiments of this invention are dependent on SAML or Liberty technology.

In a similar manner, various other existing authentication techniques may be practiced in connection with some embodiments of this invention. However, these other authentication techniques are not necessary for realizing the benefits of all embodiments of the invention. Some of these techniques include Public Key Infrastructure (PKI) techniques including public-private key pairs, digital certificates, biometric authentication, or use of conventional identifications and passwords.

The term "resource" as used herein refers to an electronic entity, a component, an application, a Uniform Resource Locator (URL), a web page, a web service endpoint, a data store, a directory, or a set of applications or data stores that cooperate for purposes of controlling access to confidential information. Thus, the resource is accessed for performing some operation (e.g., read or write) on the confidential information. Confidential information includes secure data about a principal, such as Social Security Number (SSN), name, address, phone number, e-mail address, Internet Protocol (IP) address, bank account number, password, password secrets for obtaining the password (mother's maiden name, name of pet, etc.), password, birth date, name of spouse, number of children, salary, employer, and the like.

The resource is accessed by calling a method or function associated with the resource. The method or function performs an operation associated with the resource. For example, the method or function may read confidential information stored by the resource or write confidential information to the resource. One of ordinary skill in the art will recognize other operations that a method or function may perform such as deleting, formatting, editing, printing, scanning, acquiring an image, and the like.

The term "resource" is also used to refer to an electronic device such as a printer, scanner, web camera, and the like. The electronic device is accessed to perform an operation such as acquiring an image, scanning a document, printing a document, and the like.

In various embodiments of the invention, the term "context manager" is used. A context manager provides an environment in which one or more software applications may be operated. The context manager provides one or more services to the applications such as transaction services, life cycle management services, memory persistence, and security services. In an embodiment, the context manager comprises an operating system (OS) or a virtual machine overlaid on an OS. In another embodiment, the context manager comprises container software, such as a Java 2 Enterprise Edition (J2EE) Enterprise Java Bean (EJB) Container. In yet another embodiment, the context manager may be a call context, application domain, runtime environment, etc.

An access request is an electronic request for accessing a resource. The request can be for the resource to perform some operation or for the resource to acquire and deliver some particular desired information. Identity information includes any data that is useful in establishing the identity of a principal, such as passwords, identifiers, biometric data, keys, certificates, and the like. A service is an application or system that a principal uses for gaining access to a resource. It is also to be understood that in some cases a resource may be viewed as a service and vice versa.

Various embodiments of this invention can be implemented in existing network architectures. Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a flowchart representing one method 100 for providing role-based security with instance-level granularity. The method 100 is implemented as one or more applications or services that reside in a machine-accessible or readable medium and is accessible over a network. The network may be wired, wireless, or a combination of wired and wireless.

In an embodiment, the method 100 is implemented as a service that interfaces with a context manager. The method 100 need not be in operation (e.g., it can be embedded on one or more removable machine-readable media (e.g., CD, DVD, diskette, memory stick, etc.) and distributed), but when the method 100 is operational it performs the following techniques for providing declarative role-based security with instance-level granularity.

Initially, at 110, the processing of method 100 (hereinafter security service) detects a request by a principal for access to a resource. In an embodiment, the principal sends the request to a context manager. The designations of a principal and a resource are both created by an application executing within the context manager.

The context manager controls access to the resource by permitting access by principals having an acceptable role. The context manager examines the request to determine which of the resource's methods the principal is calling. Next, the context manager determines which roles are associated with the resource and perhaps more particularly which roles may be associated with each method of the resource. Each method associated with a single resource may have an associated permission assignment comprising a list of approved roles for the method. Consequently, each method associated with a single resource may have a different list of approved roles. Alternatively, a single permission assignment, listing roles approved to access the methods of the resource, may be associated with the resource. The permission assignment may list roles approved to access the resource generally, without specifying approved roles on a per method basis.

As an example illustration, consider that a product price record (a resource) may have one method for reading the record and another method for editing the record. A permission assignment for the read method may include the roles "employee" and "supervisor." A permission assignment for the edit method may include the role "supervisor."

Continuing with the present example, a first principal assigned a role of "employee" may be permitted to read the record by calling the read method. However, the first principal is prevented from editing the record through the edit method since the role "employee" is not included in the permission assignment of the edit method. A second principal assigned a role of "supervisor" is able to both read and edit the record by calling the read method and the edit method, since the role "supervisor" is included in the permission assignments for both the read method and the edit method.

Once the context manager has determined the approved roles by examining the permission assignment associated with the requested resource or resource method, the context manager determines which roles are associated with the principal.

A principal may be associated with one or more roles. Each role may be a static role or a dynamic role. Static roles are assigned to a principal. One way to assign a static role is for the context manager to assign the static role based on a configuration associated with an identity of the principal. The configuration may specify, for example, that all principals derived from a particular class receive a particular static role.

Additionally, the security service may assign a static role. The security service may provide the context manager with one or more static roles that the context manager subsequently assigns to a principal. A third way to assign a static role is for an identity service to provide the context manager with one or more static roles that the context manager assigns to a principal. In an embodiment, the identity service provides the roles via a SAML assertion. Once a static role is assigned to a principal, the principal retains the role until an administrator, the security service, the context manager, or the identity service changes the static assignment.

A principal may also be assigned a dynamic role. A dynamic role has a status of either active or inactive. If the status of the dynamic role is active, then the principal possesses the same privileges with the assigned dynamic role as a statically assigned role. If the status of the dynamic role is inactive, the principal does not possess the privileges associated with the role. In this case, it is as if the role had not been associated with the principal at all.

Each dynamic role has one or more associated constraints. The constraints when evaluated determine the status of the role. The results, associated with evaluating the constraints, are resolved to either true or false. If the constraints evaluate to true, the status of the role is active. If the constraints evaluate to false, the status of the role is inactive. In an embodiment, each time the principal attempts to access a resource, the constraints evaluate to true or false. In this manner, the status of a dynamic role associated with a particular principal may change for each constraint evaluation. Consequently, the principal's privileges may change each time the principal makes an access request due to the changing status of the dynamic role.

In an alternative approach, the result associated with evaluating the constraint may be managed from cache such that after some configurable period of time the constraint is re-evaluated, but the constraint does not have to be evaluated for each access of a principal. In a similar but different technique, the principal's relationship with the resource is dictated by an active session. Here, the constraint may be evaluated once for an active session or at configurable points in time during that session.

In an embodiment, the security service provides a list of dynamic roles associated with a principal to the context manager at 111. In another embodiment, an identity service provides a specific role associated with the principal to the context manager. The identity service may provide the roles via a SAML assertion. The identity service may maintain a list of dynamic roles for each principal or may retrieve the list of dynamic roles from a policy store. A policy store is a file, database, directory, or combinations of the same that houses roles associated with a principal. The roles may be static roles or dynamic roles. For a static role, the status of an identity-service provided role is active. Conversely, if a dynamic role is used, then the status (active or inactive) is determined when evaluation of the constraints occur. In some cases, the identity service may evaluate the constraints and in these situations, a time-to-live value may be associated to any active dynamic roles assigned by the identity service. Additionally, the policy store may contain one or more constraints associated with each dynamic role. It is noted, that constraints may also be viewed as policies and that a given constraint may be associated with a global policy.

Once the context manager has determined the approved roles associated with the method requested by the principal, and the roles associated with the principal making the request, the context manager notifies the security service of the request. The context manager provides a list of dynamic roles associated with the principal to the security service and requests that the security service provide a status for each of the dynamic roles.

The context manager may provide a list of all the dynamic roles associated with the principal to the security service, or may provide a list of the dynamic roles associated with the principal that are also associated with the permission assignment of the resource method that the principal has requested to access. In some embodiments, the context manager may also provide the security service with the name of the method the principal has requested access to and the roles listed in the permission assignment for the method.

Alternatively, in another embodiment, the security service may detect the principal's request directly by intercepting the request. In this embodiment, the security service independently determines the roles associated with the method requested by the principal, and the static and/or dynamic roles associated with the principal making the request.

At 120, the security service evaluates the constraint associated with a dynamic role to determine the status of the dynamic role. In an embodiment, the security service determines the status of each dynamic role provided in a request from the context manager. In another embodiment, the security service determines the status of each dynamic role associated with the principal that is also associated with the permission assignment of the resource method that the principal has requested access to.

The constraint is a logical expression that evaluates either true or false. In an embodiment, the logical expression comprises an XML file. The constraint may comprise operators, values, function calls, method calls, and variables. Operators comprise functions such as "AND," "OR," "=," "not equal," "<," ">," and the like. Values comprise explicit numbers, text strings, and the like. Variables represent values. For example, a constraint may take the form "time_of_day>8:00 AM AND time_of_day<5:00 PM." In this example constraint, "time_of_day" is a variable, ">," "<," and "AND" are operators, and "8:00 AM" and "5:00 PM" are values. The example constraint evaluates to true if the current time is between 8:00 AM and 5:00 PM and evaluates to false if the current time is not between 8:00 AM and 5:00 PM. The logical expression of the constraint may also be viewed as a policy. A resource may have one or more global constraints and/or one or more local constraints.

In an alternative embodiment, the constraint may evaluate to a non-binary value, such as a range of values or a percentage. In response to the percentage, a policy or other conditional logic may ultimately determine whether a role is to be active or inactive. That is, the constraint evaluation can be associated with more complex or "fuzzy" logic and does not have to resolve to a strict binary result. For example, consider a particular constraint that evaluates to a confidence factor of 80%. This indicates with 80% confidence a particular principal is assigned an active role of Vice President (VP). Another policy may state that if a current time is outside normal business hours then the confidence factor has to exceed 95% before an active role of VP is appropriate.

In one embodiment, variables represent instance-level data. Instance-level data is data created by an application executing within the context manager. Each principal and resource managed by the context manager may be associated with instance-level data. Instance-level data may include a method name associated with a resource, parameter data associated with the principal, parameter data associated with the resource and parameters passed by the principal in a method call. Instance-level data may also include temporal data, such as the time of day or the name of the application with which the principal is associated. Moreover, the instance-level data may include other metadata appended by or acquired from the context manager and/or security service. The instance-level data may modify the original request, may be wholly included with the original request, and/or may be partially part of the request and partially separately located from the request.

The security service may identify, at 121, instance-level data referenced in the constraint. Next, at 122, the security service may retrieve instance-level data referenced by variables in the constraint from the context manager. The security service may retrieve the instance-level data through an API. In one embodiment, the security service retrieves the instance-level data through a Java Authorization Contract for Containers (JACC) API. In another embodiment, the security service retrieves the instance-level data through a Java Authentication and Authorization Service (JAAS) API. In yet another embodiment, the security service obtains a reference to an EJB or Servlet API from a JACC API. The security service then retrieves instance-level data through the EJB or Servlet API.

The security service uses the retrieved instance-level data to evaluate the constraint by plugging retrieved values into the constraint and then determining if the resulting constraint is true or false. Based on the evaluation, the security service assigns the dynamic role a status of active or inactive.

Constraints comprising variables referencing instance-level data may evaluate to true in some evaluations and false in other evaluations because instance-level data may change over time. Since the evaluation of the constraint may change, the status of the dynamic role may also change. Accordingly, the roles associated with a principal may change during the execution of an application. As a result, the context manager may allow some requests to access a resource, based on the roles associated with the principal, and deny other requests because at the time of the request the status of a role used for access is inactive.

In some embodiments, a plurality of constraints is associated with a single role. The security service may evaluate each of the plurality of constraints to determine a current status for the role. The security service may combine the results from evaluating the plurality of constraints to determine the current status in a number of ways. For example, the security service may determine that the role is active if any of the plurality of constraints evaluates true. Alternatively, the security service may determine that the role is active if all of the plurality of constraints evaluates true, including global and local constraints.

The plurality of constraints may each have an associated identifier. The identifier specifies the conditions under which the constraint should be evaluated. For example, the identifier may specify that the security service evaluate the constraint each time the security service determines the status of the role. The identifier may also specify that the security service evaluate the constraint only if the principal is attempting to access a particular type of method or a particular class of resource. Alternatively, global policies or configurations associated with constraint identifiers may be used to determine the interval or frequency with which the constraints are evaluated.

In an embodiment, at 130, the security service assigns a time to access value to the status of a dynamic role. The time-to-access value specifies an amount of time that the status of a dynamic role remains valid. While the status is active, the constraint may not require re-evaluation because the prior determined status is considered active for the period specified by the time to access value. In this manner, the time-to-access value may reduce the number of constraint evaluations performed by the security service and may establish an expiration for an assigned role.

For example, if the security service evaluates a constraint and determines that a dynamic role has an active status, the security service may specify a ten-minute time-to-access value for the status. Before issuing a subsequent request to evaluate the constraint, the context manager references the time-to-access value to see if the prior determined status of the constraint has expired.

If the subsequent request to evaluate the constraint occurs within ten minutes of the prior request, the context manager may use the prior status and need not ask the security service to evaluate the constraint. If the subsequent request to evaluate the constraint occurs more than ten minutes after the prior request, the context manager requests that the security service evaluate the constraint again and does not use the prior status. Alternatively, the context manager may request that the role assignment be reconfirmed upon the expiration of the ten minutes. Configurable situations such as this may also be handled via a constraint that evaluates to a "fuzzy" value, and the "fuzzy" value is further inspected to determine actions associated with role assignments.

The time-to-access value may be a default value known to the security service or an administrator-configured value. The security service may specify a single time-to-access value for the entire application or the security service may specify a time-to-access value for each constraint.

Once the constraint has been evaluated, the security service, at 140, provides the status of the dynamic role to the context manager. The security service may provide the status by placing the status in a variable, file, or other data structure, by calling an Application Programmer Interface (API) associated with the context manager, by returning the status as part of a function call, or by other techniques. In some embodiments, at 150, the security service also provides the time-to-access value associated with the status to the context manager.

Next, the context manager decides whether to allow the principal to access the resource according to the request. In one embodiment, the context manager compares static roles assigned to the principal with the approved roles associated with the resource or resource method that the principal desires to access. If one of the principal's static roles matches one of the approved roles, the context manager allows the principal to access the resource.

If the principal does not have an associated static role that matches one of the approved roles, the context manager determines if dynamic roles are associated with the principal. If there are no dynamic roles associated with the principal, the context manger denies the principal's request to access the resource.

If there are one or more dynamic roles associated with the principal, the context manager interacts with the security service to determine the status of the dynamic roles as described above. If one or more of the dynamic roles has an active status, as determined by the security service, the context manager compares the dynamic roles with the active status to the approved roles. If any of the dynamic roles with an active status matches one of the approved roles, the context manager allows the principal to access the resource.

In various embodiments, one or more of the approved roles associated with a resource or a resource method of a resource is a dynamic role. In determining whether the principal's request is permissible, the context manager identifies the dynamic approved role. The security service evaluates a constraint associated with the dynamic approved role to determine a status for the dynamic approved role. The security service evaluates the role in a manner similar to that described above, including requesting instance-level data if necessary for the evaluation. If the constraint evaluates true then the status of the dynamic approved role is active. If the constraint evaluates false, the status of the dynamic approved role is inactive.

If the status of the dynamic approved role is active, the context manager uses the dynamic approved role in determining if the request is permissible in a manner similar to that described above. If the status of the dynamic approved role is inactive, the context manager ignores the dynamic approved role in determining if the request is permissible.

It should be noted that in the embodiments described above, the context manager, not the application that the principal is associated with, determines whether the principal's request to access a resource is permissible. This enhanced, role-based declarative security approach is advantageous since the code to implement checking of roles is not part of the application.

Instead, the application relies on the context manager to determine permissibility. Many applications within a single context manager may rely on the context manager to perform role checking. One of ordinary skill in the art will recognize the efficiency of using this enhanced, role-based declarative security approach to make access decisions instead of implementing security code in each application.

In some embodiments, the security service, at 160, compares the static and dynamic roles associated with a principal to the approved roles and determines whether the access request is permissible. The security service may make this determination despite the fact that the context manager makes a similar determination. In one embodiment, the security service provides its determination of the permissibility of the request to the context manager. The context manager may honor the security service's determination by using the determination instead of its own determination.

In another embodiment, the security service may force the use of its determination by overriding the determination made by the context manager. In this embodiment, at 170, the security service permits the principal to access the resource if the principal has a static role or valid dynamic role matching one of the approved roles for the resource. Conversely, if the principal does not have a static role or valid dynamic role matching one of the approved roles for the resource, the security service, at 180, denies the principal's request to access the resource.

The embodiments of method 100 demonstrate a security service that interacts with a context manager for purposes of providing role-based security with instance-level granularity. The method 100 uses dynamic roles to determine whether access by a principal to a resource is permissible, thus securing the resource. The method 100 achieves instance-level granularity by evaluating a constraint, associated with a dynamic role, comprising variables that reference instance-level data to determine a status for the dynamic role.

The role is dynamic since the status of the role may change each time the security service evaluates the constraint. In some embodiments, the security service evaluates the constraint each time the principal requests access to a resource. This instance-level granularity is possible due to the constraints associated with dynamic roles.

Figure 2:
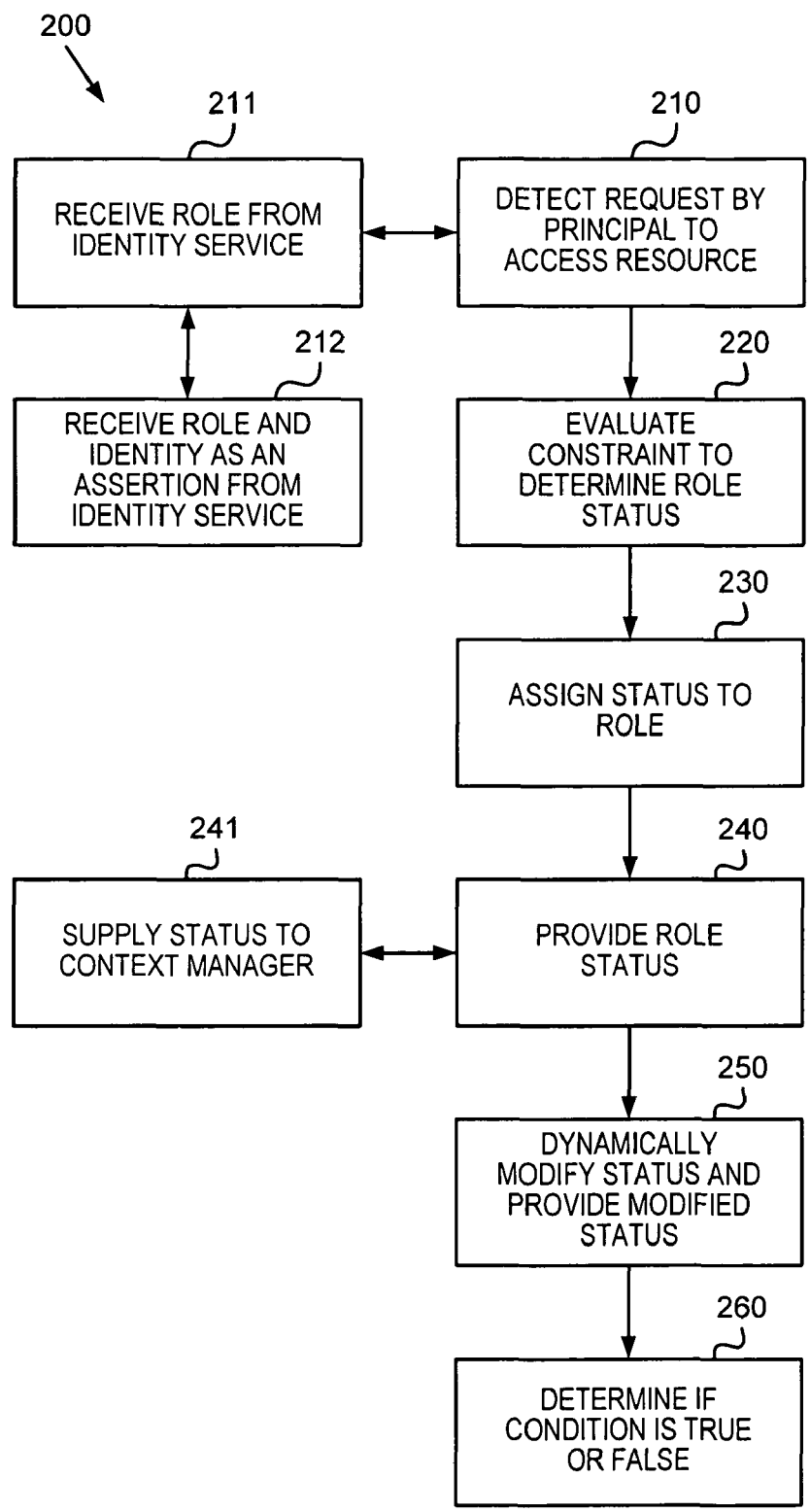
FIG. 2 is a flowchart representing another method for role-based security, according to an example embodiment.

FIG. 2 is a flowchart representing another method 200 for providing role-based security with instance-level granularity. The method 200 is implemented as one or more applications or services that reside in a machine-accessible or readable medium and is accessible over a network.

Initially, at 210, the processing of method 200 (hereinafter security manager service) detects a request by a principal for access to a resource. In an embodiment, the principal sends the request to access a resource to the security manager service.

The security manager service controls access to the resource by permitting access by principals having an acceptable role. The security manager service examines the request to determine which method associated with the resource the request is calling. Next, the security manager service determines which approved roles are associated with the method in a manner similar to the manner discussed above with respect to FIG. 1. Once the security manager service has determined the approved roles, the context manager service next determines which static and/or dynamic roles are associated with the principal in a manner similar to that discussed above with respect to FIG. 1.

In some embodiments, the security manager service, at 211, receives a list of static and/or dynamic roles associated with a principal from an identity service. The identity service may maintain a list of roles for each principal or may retrieve the list of roles from a policy store. Additionally, the context manager service may also receive the constraints associated with the roles from the identity service. The identity service may retrieve the constraints from the policy store.

The security manager service authenticates with the identity service to create a trust relationship between the security manager service and the identity service. Once the security manager service and identity service establish a trust relationship, the identity service may provide identity information about a principal, including roles, to the security manager service. In an embodiment, the identity service provides the identity information via a SAML assertion.

Principals may also authenticate with the identity service. The identity service authenticates a principal by asking for specific authentication information such as a user name and password, etc. Once the identity service has authenticated a principal, the identity service can vouch for the principal by assuring other services, such as a context manager or security manager service, of the authenticity of the principal. One way the identity service can vouch for the principal is to provide a credential.

The security manager service may receive, at 212, an assertion from the identity service in response to a request for information about a particular principal. The assertion comprises information about the principal such as static and dynamic roles associated with the principal, as well as the constraints associated with each dynamic role. In addition, the assertion vouches for the authenticity of the principal. In an embodiment, the assertion is a SAML assertion.

Once the security manager service has determined the approved roles associated with the method requested by the principal, and the roles associated with the principal making the request, the security manager service, at 220, evaluates the constraint for each dynamic role associated with the principal to determine the status of the dynamic role. In one embodiment, the security manager service determines the status of each dynamic role associated with the principal. In another embodiment, the security manager service determines the status of each dynamic role that is also an approved role.

The constraint is a logical expression, similar to the constraint discussed above with respect to FIG. 1 that may be evaluated either true or false. In one embodiment, the constraint comprises variables representing instance-level data. The security manager service identifies and retrieves instance-level data referenced in the constraint. Based on the results of the evaluation, the security manager service, at 230, may assign a status of active or inactive to the dynamic role. The assigned status may be stored in memory, a file, an object, a database, or the like.

Once the security manager service has evaluated the constraint, the security manager service, at 240, provides the status of the dynamic role. In an embodiment, the security manager service provides the status of the dynamic role to itself by storing the status in memory, a file, an object, a database, or the like. The security manager service subsequently uses the status to determine if the principal's request to access the resource is permissible.

In other embodiments, the security manager service, at 241, may supply the status to a context manager. The context manager subsequently uses the status to determine if the principal's request to access the resource is permissible in a manner similar to that described above in relation to FIG. 1. The security manager service may supply the status to the context manager by placing the status in a variable, file, or other data structure, by calling an Application Programming Interface (API), by returning the status as part of a function call, or by other techniques well known to those of skill in the art.

Next, the security manager service, in some embodiments, decides whether to allow the principal to access the resource according to the request. The security manager service evaluates a condition to determine, at 260, if the request is permissible. In one embodiment, the condition specifies that one or more of the static roles and/or valid dynamic roles matches one or more of the approved resource roles.

In other embodiments, different conditions may be used. For example, a condition specifying that more than one of the static roles and/or active dynamic roles matches one or more of the approved resource roles. A further example condition may require that a license obligation be met. For example, the license obligation may require that no more than a predetermined number of principals may access a resource simultaneously.

The condition evaluates as either true or false. If the condition evaluates true, the security manager service permits the principal to access the resource. If the condition evaluates false, the security manager service prevents the principal from accessing the resource.

In another embodiment, the context manager determines whether to allow the principal to access the resource according to the request. The context manager evaluates the condition, in the manner described above, to make a determination.

Next, at 250, some embodiments of the security manager service dynamically modify the status of a dynamic role. The security manager service may re-evaluate the constraint associated with the dynamic role to make a subsequent determination of the status. The security manager service may periodically re-evaluate the constraint and modify the status. For example, the security manager service may automatically re-evaluate the constraint every second.

Alternatively, the security manager service may rely on a trigger to re-evaluate the constraint. For example, a change in a particular variable referencing instance-level data may trigger a re-evaluation of the constraint.

If the status changes due to the re-evaluation, the security manager service provides the modified status to the context manager. If the prior status did not satisfy the condition, and the modified status does satisfy the condition, the context manager allows the principal to access the resource. If the prior status did satisfy the condition, and the modified status does not satisfy the condition, the context manager revokes the previously allowed access and prevents further access to the resource.

The embodiments of method 200 demonstrate a security manager service that provides role-based security with instance-level granularity. The method 200 uses dynamic roles to determine whether access by a principal to a resource is permissible, thus securing the resource. The method 200 may achieve instance-level granularity by evaluating a constraint, associated with a dynamic role, comprising variables that reference instance-level data to determine a status for the dynamic role. The role is dynamic since the status of the role may change each time the principal requests access to a resource, based on the evaluation of the constraint.

Figure 3:
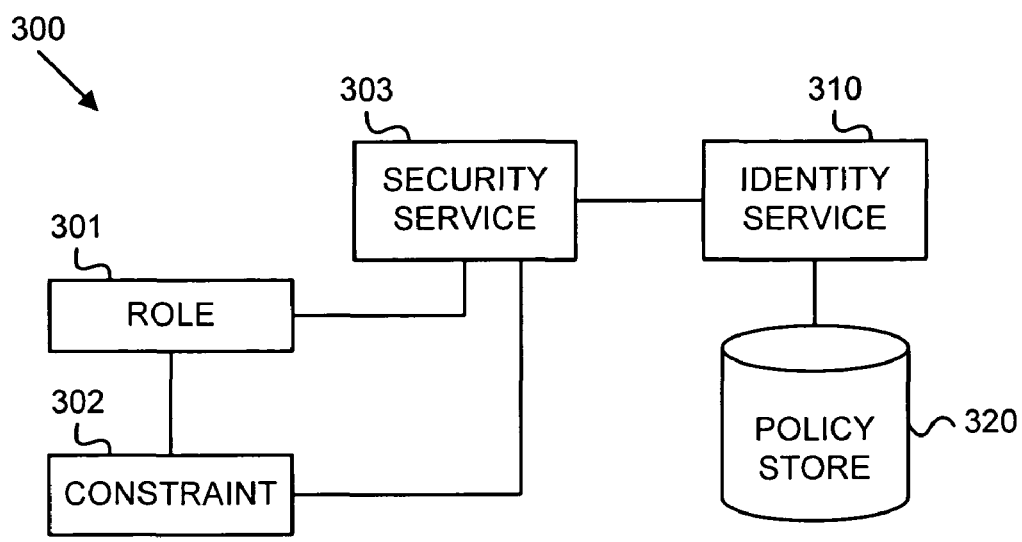
FIG. 3 is a diagram of a role-based security system, according to an example embodiment.

FIG. 3 is a diagram of a role-based security system 300. The role-based security system 300 is implemented in a machine-accessible or readable medium and accessible over a network. The network may be wired, wireless, or a combination of wired and wireless. The architectural layout of the role-based security system 300 is presented for purposes of illustration and comprehension only. A variety of other configurations is possible and is intended to fall within the generous scope of the present invention. In some embodiments, the role-based security system 300 implements the processing described above with respect to methods 100 and 200 of FIGS. 1 and 2, respectively.

The role-based security system 300 includes a role 301, a constraint 302, and a security service 303. Optionally, in some embodiments, the role-based security system 300 also includes an identity service 310. Further embodiments of the role-based security system 300 may also optionally include a policy store 320. Each of these will now be discussed in turn.

The role 301 is an identifier assigned to a principal. A context manager uses the role 301 to determine if a principal assigned the role 301 may access a resource. Multiple principals may have the same role 301. The role 301 may be a static role or a dynamic role. A principal assigned to a static role retains the static role unless the static role is revoked.

A dynamic role has a status of either active or inactive. If the status of the dynamic role is active, the principal possesses the same privileges associated with the role 301 as if the role 301 was statically assigned to the principal. If the status of the dynamic role is inactive, the principal does not possess the privileges associated with the role 301. In this situation, it is as if the role 301 had not been associated with the principal at all.

Each dynamic role has an associated constraint 302. The constraint 302 is a logical expression that may be evaluated either true or false. The constraint 302 may comprise operators, values, and variables as described above in relation to FIG. 1. The constraint 302 is evaluated to determine the status of the role 301. If the constraint 302 evaluates true, the status of the role 301 is active. If the constraint 302 evaluates false, the status of the role 301 is inactive.

In some embodiments, the constraint 302 may comprise variables that reference instance-level data. The instance-level data may comprise the name of a method associated with the resource that is called by the principal, as well as the parameters associated with the method call. The instance-level data may also comprise parameter data associated with either the resource or the principal. The instance-level data may also comprise temporal data not associated either the principal or the resource, such as the time of day that the principal makes the request. Furthermore, the instance-level data may include a variety of other metadata acquired from the context manager or from the security service 303.

The constraint 302 may also comprise one or more policies associated with the instance-level data. In some cases, policies may be viewed as sub-constraints that are aggregated to form the constraint 302. Each policy is itself a logical expression that may be evaluated either true or false. The policies may comprise operators, values, and variables. Policies are aggregated to form the constraint 302 using Boolean operators such as "AND," "OR," "NOT," and the like. Each policy may comprise variables that reference instance-level data.

For example, one policy may be that no principal may access personnel records outside of business hours. Another policy may be that principals assigned a "supervisor" role may access personnel records but principals assigned an "employee" role may not access personnel records. A constraint 302 resulting from the aggregation of these two example policies would specify that personnel records may be accessed by principals assigned a "supervisor" role during business hours. Policies and constraints 302 may be global meaning that they can be applied globally to resources, roles 301, and principals. Moreover, policies and constraints 302 may be local meaning that they can be applied under certain detected conditions for a particular resource, role 301, and principal.

The security service 303 detects a request made by a principal for access to a resource. The security service 303 may detect the request by directly intercepting the request, or may detect the request via a notification or request from a context manager. The security service 303 identifies one or more roles 301 associated with the principal and determines which of the roles 301 are dynamic roles. The security service 303 also identifies the constraint 302 associated with each dynamic role.

The security service 303 may evaluate the constraint 302 each time the principal attempts to access a resource. In this manner, the status of a dynamic role associated with a particular principal can change each time the principal makes a request to access a resource. Consequently, the principal's privileges may change each time the principal makes an access request.

The security service 303 may provide the status of the dynamic role to the context manager. The security service 303 may communicate with the context manager through an Application Programming Interface (API) associated with an external interface of the context manager.

The context manager controls access to the resource by permitting access by principals having an acceptable role. The context manager examines the request to determine which method associated with the resource the principal is calling. Next, the context manager determines which approved roles are associated with the method in a manner similar to that described above in relation to FIG. 1.

The context manager compares static and/or valid dynamic roles assigned to the principal with the approved roles. If one of the principal's static and/or active dynamic roles matches one of the approved roles, the context manager allows the principal to access the resource. The context manager may comprise an operating system, virtual machine (VM), a J2EE EJB container, a Mono container object, a .NET container object, or the like.

In some embodiments, the identity service 310 supplies the security service 303 with a list of static and/or dynamic roles associated with the principal. The identity service may provide the roles 301 via a SAML assertion. The identity service 310 may maintain a list of roles for each principal or may retrieve the list of roles from a policy store 320.

The security service 303 may authenticate with the identity service 310 to create a trust relationship between the security service 303 and the identity service 310. A trust specification defines the trust relationship. The trust specification includes policies and access rights that bound the interaction between the security service 303 and the identity service 310.

Attempted violations of the trust specification by either the security service 303 or the identity service 310 may result in the cancellation of the trust relationship. Once the security service 303 establishes a trust relationship with the identity service 310, the identity service 310 may provide the list of roles to the security service 303.

The identity service 310 may request a trust relationship before providing the list of roles to ensure a secure transfer to a trusted entity. The list of roles 301 and the constraints 302 associated with the roles 301 are sensitive information that are protected against rogue intruders.

In response to a request for a list of roles associated with a principal, the identity service 310 provides an assertion to the security service 303. The assertion comprises information about the principal such as static and dynamic roles associated with the principal, as well as the constraints 302 associated with each dynamic role. In addition, the assertion may vouch for the authenticity of the principal.

The policy store 320 is a file, database, directory, or combinations of the same that securely houses roles 301 associated with a principal. The roles 301 may be static roles or dynamic roles. Additionally, the policy store 320 houses constraints 302 associated with dynamic roles. The policy store 320 may allow the identity service 310 to access to the data the policy store 320 houses if a trust relationship exists with the identity service 310.

In an embodiment, the operation of the security service 303 is transparent to the context manager. The security service 303 may provide the status of the role 301 to the context manager without the context manager's knowledge. For example, the context manager may routinely reference a role list for the principal in determining whether to allow the principal's request.

The role list may comprise an object, variable, file, or other data structure within the environment of the context manager. The security service 303 may modify the role list within the environment by adding a valid dynamic role to the role list. The security service 303 modifies the role list before the context manager accesses the role list to make its determination. In this manner, the security service 303 transparently modifies the role list without the context manager being aware of the security service 303.

The operation of the security service 303 may also be transparent to the principal. Since the principal does not interact directly with the security service 303, the principal is not aware of the security service 303. Similarly, since the resource does not interact directly with the security service 303, the resource is not aware of the security service 303.

The role-based security system 300 permits a security service 303 to interact with a context manager for purposes of providing role-based security with instance-level granularity.

Figure 4:
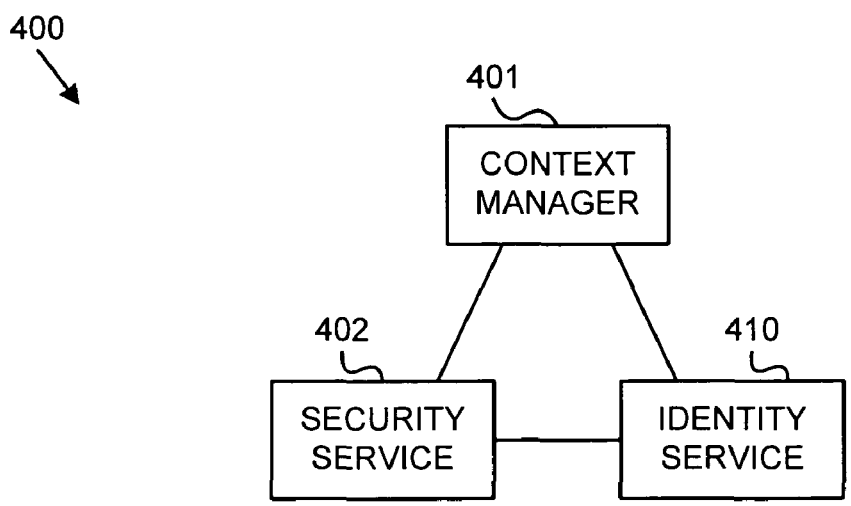
FIG. 4 is a diagram of another role-based security system, according to an example embodiment.

FIG. 4 is a diagram of another role-based security system 400. The role-based security system 400 is implemented in a machine-accessible or readable medium and accessible over a network. Again, the architectural layout of the role-based security system 400 is presented for purposes of illustration and comprehension only. A variety of other configurations is possible and is intended to fall within the generous scope of the present invention. In some embodiments, the role-based security system 400 implements the processing described above with respect to methods 100 and 200 of FIGS. 1 and 2, respectively.

The role-based security system 400 includes a context manager 401, and a security service 402. Optionally, in some embodiments, the role-based security system 400 also includes an identity service 410.

The context manager 401 controls access to a resource by permitting access to principals having an acceptable role. The context manager 401 makes an independent decision regarding a principal's request by examining the request to determine which method associated with a resource the principal is calling. Next, the context manager 401 determines which approved roles are associated with the method in a manner similar to that described above in relation to FIG. 1.

The context manager 401 compares static and/or active dynamic roles assigned to the principal with the approved roles. If one of the principal's static and/or active dynamic roles matches one of the approved roles, the context manager 401 allows the principal to access the resource.

The context manager 401 also receives a decision regarding the principal's request from the security service 402. The context manager 401 examines both its own independent decision and the decision provided by the security service 402 and decides whether to grant access to the resource. In one embodiment, if the two decisions conflict the context manager 401 gives preference to its own decision by overriding the security service decision.

In another embodiment, if the two decisions conflict the context manager 401 gives preference to the security service decision by overriding its own decision. In yet another embodiment, if either of the decisions indicates that access should be denied, the context manager 401 denies access. In yet another embodiment, the security service 420 may force its decision about access by manipulating an API associated with the context manager 401 to force the decision of the security service 420.

The context manager 401 may comprise an operating system, VM, a J2EE EJB container, a Mono container object, a .NET container object, or the like. The context manager 401 provides an environment in which one or more software applications may execute. The environment may comprise instance-level data associated with objects created within the environment by applications and one or more services available to applications operating within the environment such as transaction services, life cycle management services, memory persistence, and security services.

The security service 402 detects a request made by the principal for access to the resource. The context manager 401 may detect the request by directly intercepting the request, or may detect the request via a notification from the context manager 401. The security service 402 may resolve a role for the principal by identifying one or more roles associated with the principal. The security service 402 also determines which of the identified roles are dynamic roles and identifies a constraint associated with each dynamic role.

The security service 402 may evaluate the constraint in a manner similar to that described above in relation to FIG. 3. In evaluating the constraint, the security service 402 may acquire information associated with the environment such as temporal data. Additionally, the security service 402 may acquire access-related data associated with the resource, the principal, or both the resource and the principal. The access-related data may comprise the name of a method associated with the resource that is called by the principal, as well as the parameters associated with the method call. The access-related data may also comprise parameter data associated with either the resource or the principal.

The security service 402 may evaluate the constraint 302 each time the principal attempts to access a resource. In this manner, the status of a dynamic role associated with a particular principal can change each time the principal makes a request to access a resource. Consequently, the principal's privileges may change each time the principal makes an access request. Alternatively, evaluation may occur once during a session between the principal and the resource or occur at predefined intervals during the session.

The security service 402 may also evaluate a condition associated with the principal's request to decide whether to allow the principal to access the resource according to the request. In one embodiment, the condition specifies that one or more of the static roles and/or active dynamic roles associated with the principal match one or more approved resource roles in a manner similar to that discussed above in relation to FIG. 2.

In other embodiments, different conditions may be used. For example, a condition specifying that more than one of the static roles and/or active dynamic roles matches one or more of the approved resource roles. A further example condition may require that a license obligation be met. For example, the license obligation may require that no more than a predetermined number of principals may access a resource simultaneously.

The condition evaluates as either true or false. If the condition evaluates true, the security service 402 decides to permit the principal to access the resource. If the condition evaluates false, the security service 402 decides to prevent the principal from accessing the resource.

The security service 402 communicates its decision to the context manager 401 in a manner recognized by the context manager 401. The manner of communication may be a variable, file, or other data structure, by calling an Application Programming Interface (API), by returning the status as part of a function call, or by other techniques well known to those of ordinary skill in the art.

In an embodiment, the identity service 410 assists the security service 402 by resolving the identity of the principal in a manner similar to that described above in relation to FIG. 2. Additionally, the identity service 410 may resolve a list of roles with which the principal is associated and provide the list to the security service 402 in a manner similar to that described above in relation to FIG. 2.

The role-based security system 400 permits a security service 402 to interact with a context manager 401 for purposes of providing role-based security with instance-level granularity. One now appreciates how an application may provide role-based security with instance-level granularity. This provides novel benefits to customers in that fine-grained security control of resources is possible with minimal additional administrative overhead.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   detecting, by the machine, a request by a principal for access to a resource, access is conditioned on a status of a role associated with the request, the principal, and the resource, the role provides instance-level granularity for security permission assignments with respect to accessing the resource, the instance-level granularity represents instance-level data created by an application within a context manager and the instance-level data includes a name associated with the resource, parameter data associated with the principal, parameter data associated with the resource, and parameter data passed by the principal in a call to the method;
   providing, by the machine via the context manager a processing environment within which the resource and the method process and the context manager providing transaction services, lifecycle management services, memory persistence, and security service, the context manager also informing the method of the request and the context manager providing a list of available roles for the principal back to the method that the method resolves within the context of the request, the processing environment provided by the context manager is a virtual machine overlaid on an operating system;
   evaluating, by the machine, a constraint associated with the role to determine the status, the constraint is an expression that evaluates to a percentage, the expression includes operators, values, function calls, method calls, and variables, and the constraint is either a global constraint or a local constraint; and
   providing, by the machine, the status to the context manager, which decides whether to provide access to the resource for purposes of satisfying the request.

2. The method of claim 1 further comprising, supplying, by the machine, the context manager with the role, wherein the role assists the context manager in deciding whether to provide access to the resource.

3. The method of claim 1 further comprising, determining, by the machine, whether access to the resource for the purposes of satisfying the request is permissible in response to the status.

4. The method of claim 3 further comprising, at least one of:
   denying, by the machine, the principal access to the resource if the status is determined to be false; and
   permitting, by the machine, access by the principal to the resource if the status is determined to be true.

5. The method of claim 1 further comprising:
   assigning, by the machine, a time-to-access or a time-to-live value to the status; and
   providing, by the machine, the time-to-access or the time-to-live value to the context manager.

6. A machine-implemented method to execute on a machine, comprising:
   detecting, by the machine, a request made by a principal for access to a resource, access is contingent on a status of a role associated with the principal and a condition associated with the principal and the resource;
   statically defining, by the machine and via a context manager the role based on a configuration associated with an identity of the principal, the context manager is a virtual machine overlaid on an operating system;
   evaluating, by the machine, a constraint associated with the role to determine the status, the constraint is an expression that evaluates to a range of values, the expression includes operators, other values, function calls, method calls, and variables, and the constraint is either a global constraint or a local constraint; and
   providing, by the machine, the status, the status is subsequently processed to resolve the condition and determine whether access to the resource for the purposes of satisfying the request is permissible.

7. The method of claim 6, wherein providing further includes supplying the status to a context manager, wherein the context manager determines whether access to the resource is permissible.

8. The method of claim 6 further comprising, assigning, by the machine, the status to the role in response to evaluating the constraint.

9. The method of claim 6 further comprising, receiving, by the machine, the role from an identity service.

10. The method of claim 9, wherein receiving further includes receiving the role and an identity for the principal as an assertion from the identity service which vouches for the role and for the identity of the principal.

11. The method of claim 6 further comprising, dynamically modifying, by the machine, the status and providing the modified status to a context manager, wherein the modified status revokes previous access permitted by the context manager to the resource.

12. The method of claim 6, wherein evaluating further includes dynamically determining whether the condition is true or false at least partially in response to a statically assigned role.

13. A machine-implemented system, comprising:
   a role;
   a constraint associated with the role; and
   a security service implemented in a machine-readable medium and to execute on a machine, the security service detects a request made by a principal for access to a resource, access is contingent on a status of the role and a condition associated with the principal and the resource, and the security service evaluates the constraint to determine the status, the constraint is an expression that evaluates to a percentage or a range of values, the expression includes operators, other values, function calls, method calls, and variables, and the constraint is either a global constraint or a local constraint, and the security service provides the status to a context manager which controls access to the resource, the context manager statically defines the role based on a configuration associated with an identity of the principal, the context manager is a virtual machine overlaid on an operating system.

14. The system of claim 13, further comprising an identity service, wherein the identity service supplies the security service with one or more roles which can be associated with the principal.

15. The system of claim 14, wherein the identity service interacts with the security service according to a trust specification.

16. The system of claim 14, wherein the identity service provides the roles to the security service as an assertion.

17. The system of claim 13, wherein the security service communicates with the context manager through an Application Programming Interface (API) associated with an external interface of the context manager.

18. The system of claim 13, wherein the request includes instance-level data having at least one of a method name associated with the resource, parameter data associated with the principal, parameter data associated with the resource, parameter data associated with the method name, and temporal data associated the request, and wherein the constraint includes one or more policies associated with the instance-level data.

19. The system of claim 18, wherein the operation of the security service is transparent to at least one of the context manager, the principal, and the resource.

20. A system, comprising:
   a context manager implemented in a machine-readable medium and to execute on a machine; and
   a security service implemented in a machine-readable medium and to execute on a machine, a principal makes a request for access to a resource within an environment of the context manager, the context manager is a virtual machine overlaid on an operation system, the security service detects the request and supplements a decision regarding access by at least one of resolving a role for the principal, evaluating a constraint associated with the role, the constraint is an expression that evaluates to a range of values, the expression includes operators, other values, function calls, method calls, and variables, and the constraint is either a global constraint or a local constraint, and evaluating a condition associated with the principal and the resource, the security service communicates an access decision to the context manager in a manner recognized by the context manager, the context manager decides in response to its own independent decision and in response to the security service's access decision whether to grant access to the resource in order to satisfy the request of the principal, and the context manager statically defines the role based on a configuration associated with an identity of the principal.

21. The system of claim 20 further comprising, an identity service that assists the security service in at least one of resolving the identity of the principal and resolving a list of roles with which the principal may be associated.

22. The system of claim 20, wherein the security service acquires information associated with the environment when evaluating the constraint.

23. The system of claim 22, wherein the information includes access-related data associated with at least one of the resource and one or more principals.

* * * * *

UNITED STATES PATENT AND TRADEMARK OFFICE
CERTIFICATE OF CORRECTION

PATENT NO. : 7,774,827 B2  Page 1 of 1
APPLICATION NO. : 11/145704
DATED : August 10, 2010
INVENTOR(S) : Stephen H. Kinser et al.

It is certified that error appears in the above-identified patent and that said Letters Patent is hereby corrected as shown below:

In column 19, line 19, in Claim 18, after "associated" insert -- with --.

Signed and Sealed this

Thirtieth Day of November, 2010

David J. Kappos
*Director of the United States Patent and Trademark Office*